O. W. JOHNSON.
ROTARY PLOW.
APPLICATION FILED MAR. 24, 1913.
1,145,147.
Patented July 6, 1915.
4 SHEETS—SHEET 3.
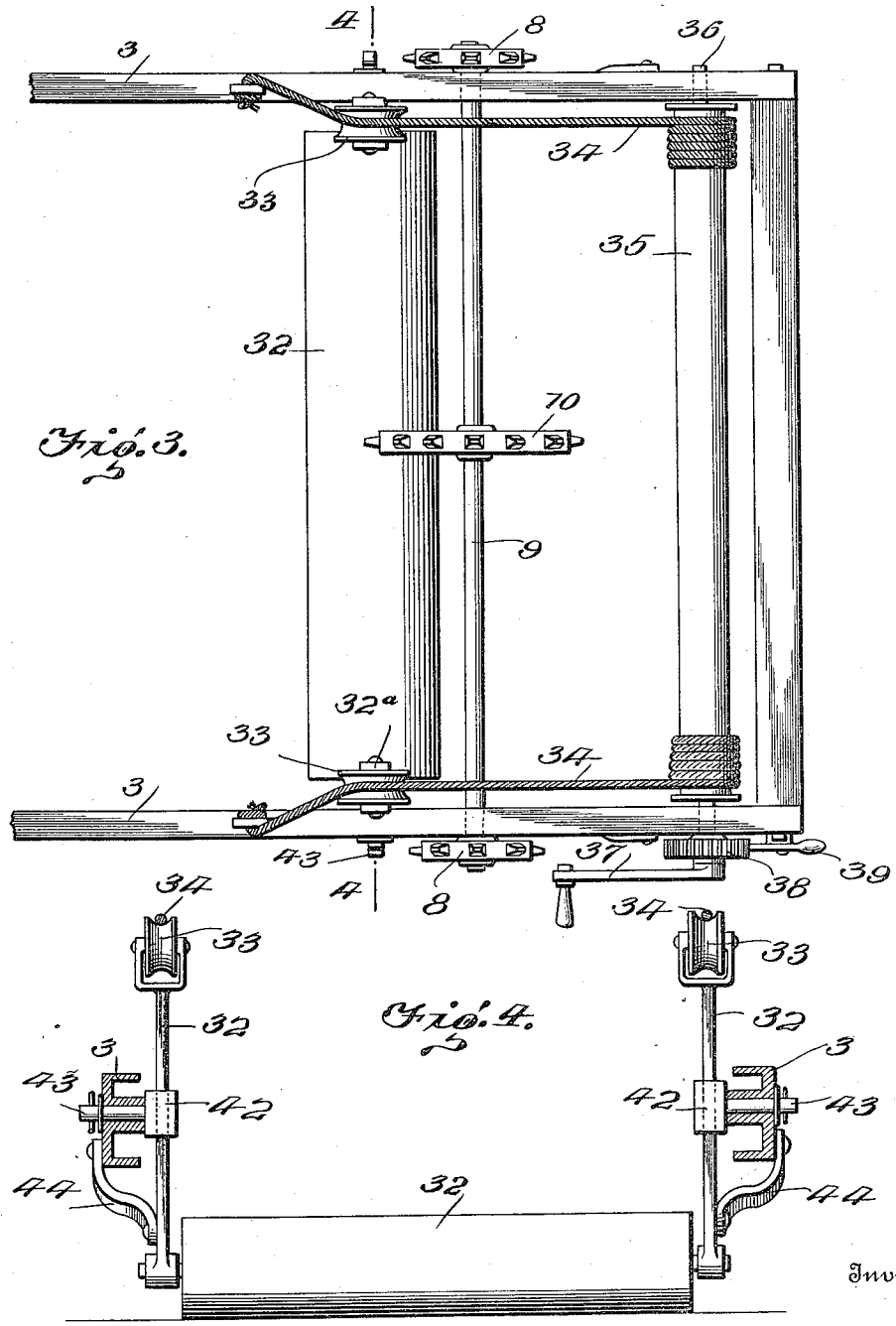

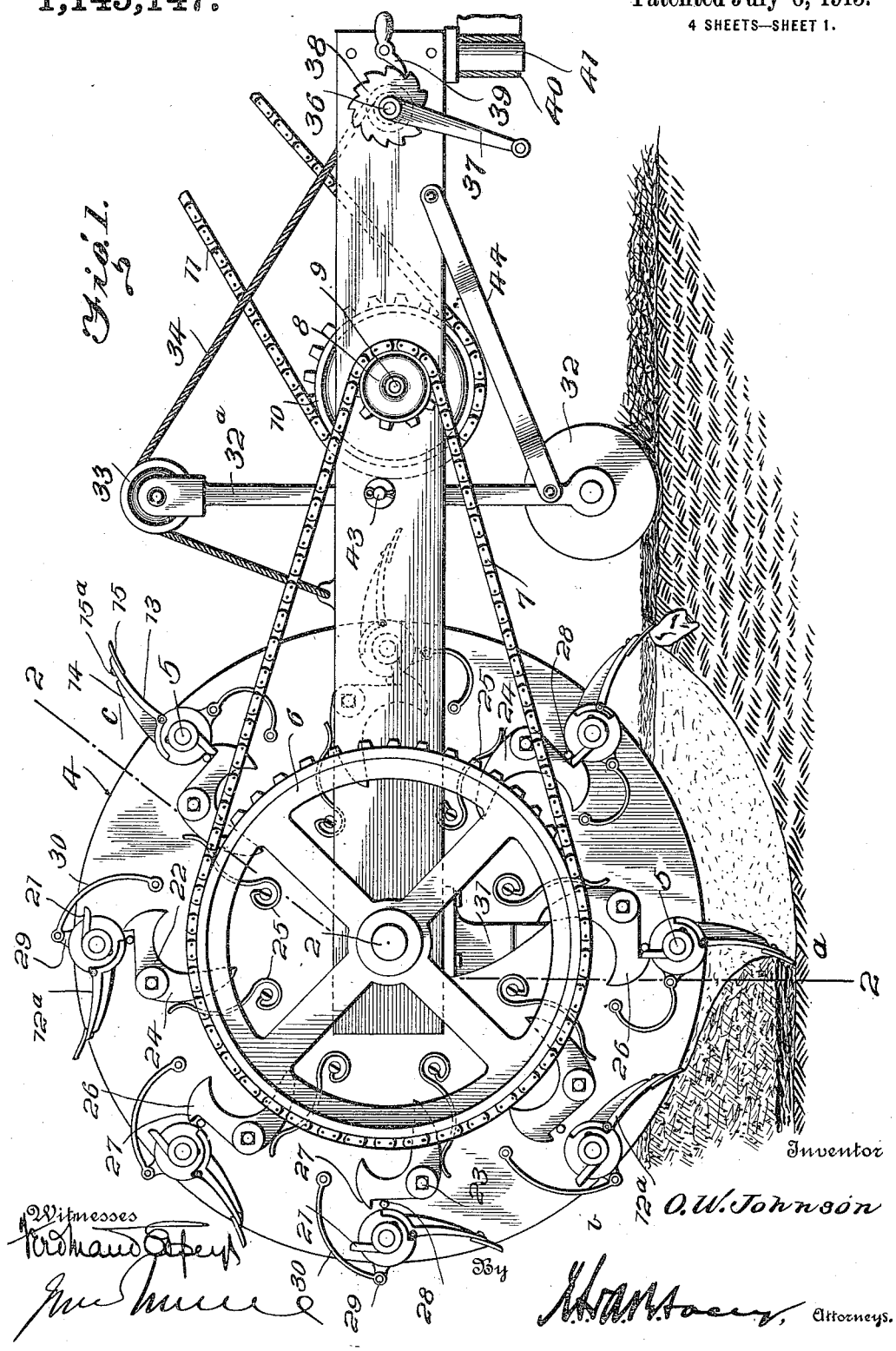

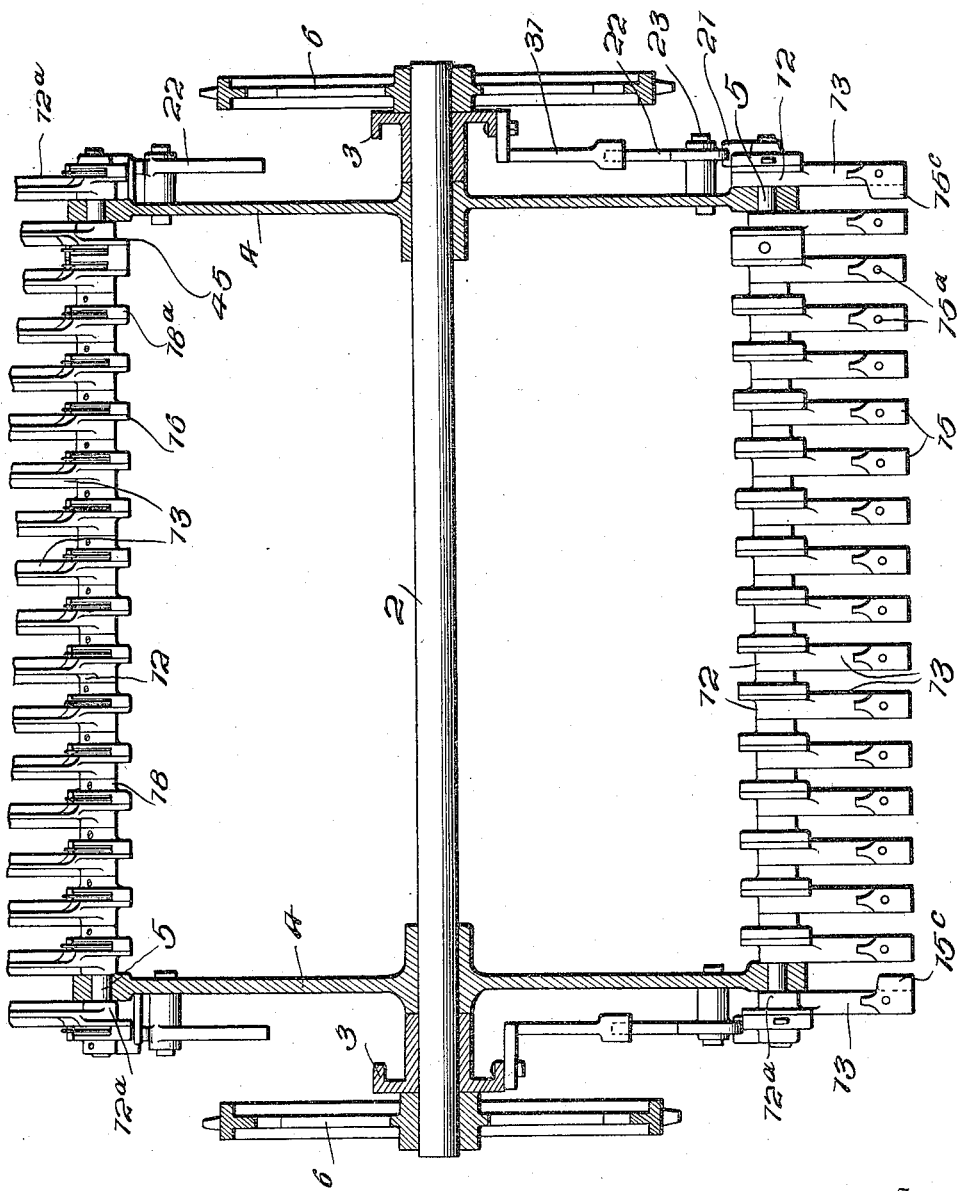

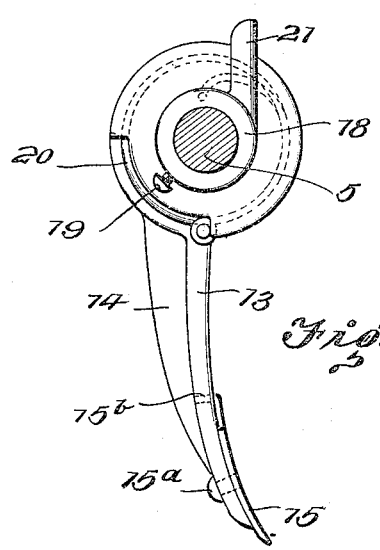
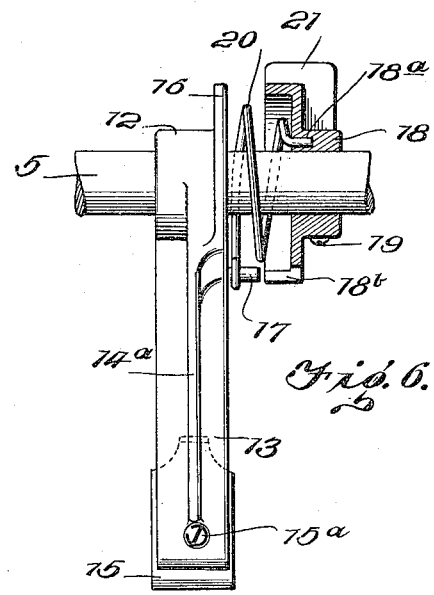
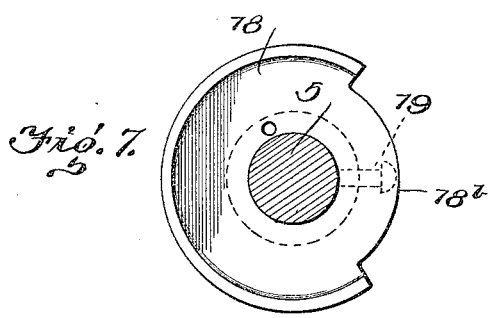
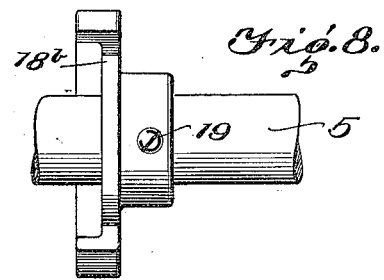
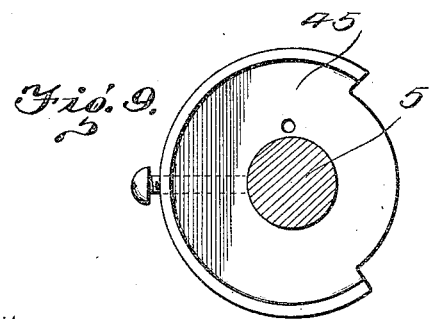
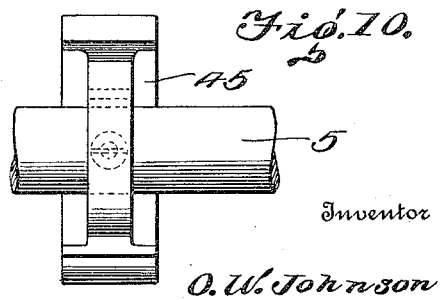

UNITED STATES PATENT OFFICE.

OLIVER W. JOHNSON, OF CLEVELAND, OHIO.

ROTARY PLOW.

1,145,147.                   Specification of Letters Patent.         Patented July 6, 1915.

Application filed March 24, 1913. Serial No. 756,476.

*To all whom it may concern:*

Be it known that I, OLIVER W. JOHNSON, citizen of the United States, residing at Cleveland, in the county of Cuyahoga and State of Ohio, have invented certain new and useful Improvements in Rotary Plows, of which the following is a specification.

My invention relates to plows and particularly to those plows having gangs of blades or shovels operating to dig up the ground, being a plow in contradistinction to plows having shares drawn through the ground.

The primary object of my invention is to provide a plow capable of operating over a larger surface at one time than the ordinary share plow.

A further object is to provide a plow which will more perfectly turn up the soil and by which any top dressing will be deposited at the bottom of the furrow.

A further object is to provide a plow which will require less tractive power to work it over a definite piece of soil than the ordinary plow.

A further object is to provide a plow having thereon a plurality of gangs of shovel blades so arranged that the gangs of blades come intermittently into digging engagement with the soil and in which the blades are so mounted that the soil will not be carried around with the blade or upward from the ground but will be dug up and left in place by the blades.

A still further object is to provide means whereby the ground beneath the supporting wheels of the plow will be dug up as well as the ground between or on either side of the supporting wheels.

A further object of this mechanism is to provide a rotary plow which will cut the soil from top to bottom in such a manner that a thorough and fine pulverizing of the soil is assured, and further to so construct the plow that the top soil will be laid at the bottom of the furrow.

A further object of the invention is to provide means whereby individual shovel blades or a number of these shovel blades will be lifted upon contact with a stone or other obstruction so that they may clear the obstruction and thus prevent the shovel blades being broken or the action of the plow stopped.

A further object of the device is to so construct it as to avoid the necessity of having all of the blades of a gang raised when one or more of the blades only engage the obstruction and thus avoid missing large areas of soil, and in this connection to so construct the plow that there will be only as many shovels raised to clear the obstruction as are engaged by the obstruction, the remaining shovels being in their normal or cutting position.

A further object is to so construct the plow that no wheel or roll mark will be left on the plowed ground, thus avoiding any packing of the ground beneath the wheels of the plow.

Other objects will appear in the course of the following description.

My invention is illustrated in the accompanying drawings wherein:

Figure 1 is a side elevation of a plow constructed in accordance with my invention. Fig. 2 is a vertical section taken on the line 2—2 of Fig. 1. Fig. 3 is a plan view of the front portion of the plow. Fig. 4 is a section on line 4—4 of Fig. 3. Fig. 5 is a detail side elevation of one of the blades with the shaft upon which it is mounted in section. Fig. 6 is a rear elevation of the same with a part in section. Figs. 7 and 8 are respectively side and edge views of the shell shown in Figs. 5 and 6. Figs. 9 and 10 are views similar to Figs. 7 and 8 showing a double collar or shell.

Referring to Figs. 1 and 2, 2 designates an axle mounted in the rear ends of frame beams 3. This axle is preferably mounted for rotation and acts as the driving shaft of the plow.

Mounted upon the axle to turn therewith and disposed just inward of the frame beams 3 are the disk-like wheels 4 which may be of any suitable character and are designed to travel slightly below the surface of the ground. Disposed adjacent to the peripheries of these wheels 4 are a plurality of transverse blade supporting shafts 5. Eight of these shafts 5 are shown, but I do not wish to be limited to this number. In order to prevent confusion, in Fig. 2 only the upper and lower shafts 5 are illustrated. The shafts 5 are rotatably mounted in the thickened rim portions of the wheels 4. The shafts 5 are all alike and carry upon them a plurality of shovel blades, as will be later stated.

Mounted upon the axle 2 are the sprocket wheels 6 of any suitable character, over which pass sprocket chains 7. These sprocket chains at their forward ends pass over relatively small sprocket wheels 8 mounted upon a shaft 9 which in turn carries a driving sprocket wheel 10 operatively connected to a motor mounted upon a tractor disposed in advance of the plow and not illustrated. As illustrated, the sprocket wheel 10 is engaged by the sprocket chain 11 which passes to the engine or other motor carried upon the tractor and not shown.

The shafts 5 project at both ends beyond the outer faces of the wheels 4. That portion of each shaft 5 disposed between the wheels 4 carries upon it a plurality of spaced shovel blades designated 12, one of these blades being illustrated in Figs. 5 and 6. Each blade comprises a hub rotatably mounted on the shaft 5, and a blade 13 which extends out from the hub is relatively wide and slightly curved and is provided at its outer end with a detachable cutting plate 15 attached to the body of the blade by means of a screw 15$^a$, the inner extremity of the plate 15 having an inwardly extending lug 15$^b$ which engages in a recess in the body of the blade.

The flat blade 13 is braced by means of a longitudinal web 14 formed integral with the hub and blade. Formed integral with the hub is a flat disk 16 provided with an integral outstanding lug or pin 17 and fixedly mounted upon the shaft 5 adjacent to each blade and spacing the blades apart, is a sleeve 18 having an annularly flanged shell 18$^a$, this flange being cut away along a portion of the circumference of the shell as at 18$^b$, the ends of this flange forming stops adapted to engage with the pin 17 to limit the movement of the blade relative to the sleeve, the sleeve being held upon the shaft 5 in any suitable manner as by a set screw 19.

Housed within the shell 18$^a$ is a coil spring 20. One end of this spring is connected to the shell by insertion into a recess in the sleeve 18 and the other end of the spring engages with the pin 17. With this construction it is plain that the blade has a limited rotative movement relative to the shaft 5, this movement however being resisted by the spring 20, and that if the blade be rotated against the force of this spring 20 and the blade be released, the spring 20 will cause the blade to be returned to its normal position. This normal position as illustrated in Fig. 1 is radial to the shaft 2. Unless, therefore, some force is used to change the position of the blade against the force of the spring, the blade will be held in this radially disposed position with its stop pin 17 against one of the shoulders at the end of the cutaway portion 18$^b$. It will be seen that the blades 12 move with the shaft so that all the blades will move coincidently with the shaft but that each blade may have an individual movement of its own against the force of the spring 20 and when the cause of this individual movement has ceased, the blade will return to its initial and normal position which, of course, is the position of all the other blades on the same shaft.

In order to lock the blades in a radially directed position at the time they enter the ground and retain these blades in this position while they are being shifted through the ground to a certain extent, I provide the blades 12$^a$ mounted upon the ends of each shaft 5. Each shaft 5, as will be seen from Fig. 2, projects beyond the disk-like wheels 4 and the blades 12$^a$ are mounted upon the ends of each shaft 5. The blades 12$^a$ are of the same construction as the blades 12 except as regards the cutting plate 15 which is not disposed so that it projects equally on both sides of the blade portion 13 of the blade, but these cutting plates project inward beyond the inner edge of the blade shank as illustrated in Fig. 2 at 15$^c$.

The blades 12$^a$ are freely shiftable upon the shaft 5 and are connected to a shell 18$^a$ by means of a spring 20, but the shell 18$^a$ coacting with each one of the blades 12$^a$ is provided with a projecting lug 21 (see Figs. 5 and 6). This lug 21 extends tangentially to the hub of the shell and normally extends inward, that is, toward the central axis of the disk 4 and in position to be engaged by a latch 22 pivotally mounted upon a bolt 23 or other suitable pivotal support projecting from the disk. There are of course on each wheel 4 as many latches 22 as there are shafts 5. Each of the latches as illustrated is approximately right angular in form. One arm 24 projects radially inward and has a rounded outer face engaged by a spring 25. The other arm of the latch extends normally approximately parallel with the periphery of the disk 4 and at its end is provided with a head 26, this head having an outwardly projecting tooth 27 or detent adapted to engage with the detent tooth or lug 21. A stop pin 28 is provided for each lug 21, this stop pin projecting laterally from the disk 4 in such position as to engage with the lug 21 when the blade 12$^a$ is extended radially outward. The shell 18$^a$ is also provided with a radially projecting lug 29 to which is connected a relatively light spring 30 whose other end is attached to the disk 4, this spring acting with another to urge the shell into a position with its lug 21 against the stop pin 28. The springs 30 for each gang of blades are not of sufficient strength to draw the blades to a radially projected position but they assist gravity in carrying the gang of blades to a radially projected position. When so projected the tooth 27 of the latch 22 engages over the lug 21 so that the lug 21 is held between the tooth 27 and the pin 28, the latch being held in its engaging position by the spring 25.

Disposed in the path of movement of the tails 24 of each set of latches is a tripping member 31. As illustrated, each tripping member is attached to one of the side bars 3 as illustrated in Fig. 1 and extends downward. Each tripping member 31 is formed with a vertically disposed forward edge face, and as each latch arrives at the lowest point of its path of movement, the inner extremity of the tail 24 of the latch will engage the lower extremity of the tripping member, and upon a further movement of the disk 4 so as to carry the latch rearward this tripping member 31 will lift the latch. This will free the latch from its engagement with the lug 21 and leave the shaft, therefore, free to turn in a counter-clockwise direction. The shaft will be caused to turn in this counter-clockwise direction by the pressure of the earth in the cut made by the blades against the face of the blades, and the blades will turn from the position indicated by $a$ to the position indicated by $b$ in Fig. 1. When the blades have freed themselves from the earth they will take a depending position, but as they commence to move downward and forward, the springs 30 with gravity will act to rotate the shaft and blades to the radially disposed position shown at $c$ in Fig. 1, until the lug 21 comes in contact with the stop 28. The extremity of the lug 21 being beveled and the extremity of the tooth 27 being beveled, it will be obvious that the lug 21 will shift the head of the latch 26 inward until it has passed beyond the tooth 27 and then the spring 25 will force the latch outward again and the blade will be held positively between the latch and the pin 28. Each set of blades will therefore be held in a radially directed position from the time they commence to move downward and forward to the lowermost position $a$. When they reach this lowermost position, however, each set of blades will rotate to the position shown at $b$ and will keep this position tangential to the path of movement while they are moving upward and rearward out of the earth. The object of this construction will be hereafter stated.

As before stated, there is one other feature in which the shovel blades 12$^a$ differ from the blades 12. Means must be provided for operating immediately beneath the wheels 4 and to this end the shovel blades 12$^a$ are formed with alternately right and left inwardly projecting cutting edges designated 15$^c$ which cut and engage the ground beneath the corresponding wheel 4. Every alternate shovel blade 12$^a$ is formed with these inwardly projecting cutting edges 15$^c$, while every alternate blade adjacent the inside faces of the disk 4 is formed with outwardly projecting blades 15$^c$. As these blades 15$^c$ on alternate shafts overlap each other, it will be seen that the ground beneath each of the wheels 4 will be cut away or plowed up.

It will be noted that when one gang of shovel blades cuts a swath through the ground it leaves a ridge between the blades and it is for this reason that I set the shovel blades upon one shaft 5 in staggered relation to the shovel blades on the next adjacent shafts so that the shovels of the immediately following gang will cut out the ridges left by the shovels of the preceding gang.

For the purpose of adjusting the depth of cut, I provide a roller designated 32$^a$ which has a length equal to the space between the frame beams 3 and which is so mounted that it may be moved vertically downward to any desired degree to raise the rear end of the frame bars 3 to thereby raise the shovel gangs with relation to the surface of the ground. The ends of the roller 32 are mounted in upwardly projecting rods 32$^a$ carrying at their upper ends the sheaves 33 over which pass cords or cables 34, the cables being attached at their rear ends to the frame bars 3 and at their forward ends passing over a winding roller 35, or other suitable tightening device. As illustrated this winding roller is mounted upon a shaft 36 provided at one or both ends with a crank handle 37 and also provided with a ratchet wheel 38 engaged by a pawl 39 whereby the winding roller may be held from any backward movement. It will be obvious that upon a tightening up on the cord 34, the rods 32$^a$ will be forced downward, carrying with them the roller 27 and lifting the frame. The forward end of the frame is provided with a pivot bolt 41 engaging in a clevis or eye 40 supported by the tractor (the latter not being shown).

Preferably the rods 32 or standards, as illustrated in Fig. 4, are mounted in guides 42 which are shown as integral with pins 43 that extend through and have rocking bearing in the side beams 3. The lower ends of the rods 32 are held in vertical position by means of links 44 attached each at one end to the lower end of a standard or rod 32 and at the upper end to the adjacent side beam 3. It will be seen that under these circumstances the rods or standards 32 will have a slight rocking movement as they move upward or downward, this rocking movement being permitted by the pins 43.

The operation of my invention is as follows: As the plow moves forward under the tractive influence of the tractor, the wheels 4 will be given a rotation in a clockwise direction. As the wheels 4 rotate, the gangs of shovel blades will be carried downward into the earth and move rearward. At their lowest point, each of these gangs will be tripped so as to permit the blade to be easily drawn out of the earth without disturbing the earth through which they move. As they move upward through the earth, the shovel blades take a tangential position which permits them to slip out of the earth easily. As soon as they clear the ground, each gang of blades takes a depending position until it reaches the point where the blades pass over and beyond the central axle and commence to move downward and forward. At this point the springs 30 and gravity act to throw the blades around to a radially projected position. When the lugs 21 strike the pins 28, the jar thus given to all of the blades of the gang will cause any earth which may still remain sticking to the blades to be detached. The blades are then carried downward and into the ground and the cycle of operation as above described is continued.

In case one or more of the blades should strike a boulder or stone too difficult for the blades to move, the blades will not be broken nor will the power be stopped for the reason that the blades are permitted to yield individually to an extent which will permit the blades to lift and pass over the stone or boulder. As soon as the blades have passed over the obstruction, the springs 20 will again act to turn the blades to a radially directed position.

For the purpose of using shovel blade units and allowing these units to be interchanged, I provide on every alternate shaft 5 a double collar like 18, this double collar being shown in Figs. 9 and 10 and designated 45. This carries the springs 20 on both sides, the springs engaging the adjacent shovel blades in the same manner as previously described. This collar 45 provides a spacing means whereby the blades 12 of one shaft may be set in staggered relation with the blades 12 of the next adjacent shaft. Inasmuch as the gangs of blades are set in staggered relation to each other, every portion of the ground will be dug up including the ground immediately beneath the wheels 4.

It is to be particularly pointed out that the peculiar mechanism I have devised whereby the blades will be tripped when they have reached their lowest position to permit the blade to be withdrawn has a peculiarly vital function in that when the shovel blade is released, the earth dug up by the blade is left in the furrow and not piled up behind the wheel as it would be if the shovels were stiff and projected radially from the wheels. Releasing the gangs of blades at their lowermost point causes the top soil and manure to be left in the bottom of the furrow and not carried again to the top of the dug soil.

The plow is attached to the tractor and before the tractor begins its forward movement the plow is started rotating. After the rotation of the plow has begun, the plow is lowered gradually into the soil to the depth desired by the operator. The tractor then begins to move forward and the plow begins cutting the soil under it.

When the plow has arrived at the end of the field it can be instantly raised up and out of the soil by the operator without stopping its revolutions. Of course, this also applies to cases where it is desired to raise the plow in the middle of the field.

It is to be noted that the plow is so constructed that only a very light tractor need be used for drawing and operating it. The mechanism of the plow is simple and can not easily get out of order or be broken, and as all parts are readily removable and replaceable, repairs are easily made. The various parts of the plow are so simple that the parts can be made interchangeable and thus be easily kept in stock. The framework of the plow, that is, the wheels 4 and the shafts 5, is simple and may be made very durable so that only the shovels and the latches will be likely to break and need be replaced.

The plow may be adjusted to cut to any depth desired without any undue increase of power. It will act to pulverize the soil to a depth and in a manner not possible with ordinary plows or cutting and pulverizing machines, as it cuts and pulverizes the whole furrow from top to bottom and does not merely cut through the soil and turn it over. This is of particular importance in view of the fact that in order to secure deep mellow soil the ground should be thoroughly pulverized as it is turned over.

It is obvious that the plow herein described may be made of any desired size and operated by a very light power. The plow as illustrated is designed to cut a gain of earth at each rotation five feet long by eight inches deep and twenty-four inches wide. An ordinary mold-board plow with two horses would ordinarily be capable of plowing a furrow six inches deep, twenty-four inches wide and five feet long in a certain length of time, but in the same time the rotary plow will cut a gain equal to five feet long in every revolution. It will be seen that the mold-board plow must travel twenty-five feet in order to plow the same number of cubic inches as my improved plow will turn up in a travel of five feet. Furthermore, my improved plow eliminates the friction incident to the use of the ordinary mold-board plow which as pulled through the ground takes relatively great tractive power. This requires a very heavy tractor, so heavy that it is useless on ordinary soft or stubble lands.

What I claim is:

1. A plow including rotatable members, a shaft upon which they are rotatably mounted, a plurality of rotatable shafts disposed adjacent the peripheries of the rotatable members and connecting the same, a plurality of blades mounted on each shaft and rotatable therewith, latches operatively engaging the shafts to lock them from rotation successively as they reach their forwardmost position and thereby lock the blades in a radially projected position, and means for releasing the latches when the blades have reached their lowermost position and are vertically disposed, to permit the shaft to have free rotation.

2. A plow including a rotatable member, a series of shovel blades pivotally mounted upon the periphery of said member and freely rotatable in a vertical plane, a stop disposed inward of the pivotal axis of each of the blades and each engaging a blade to prevent a rotation in one direction and hold the blade in a radially directed position, a plurality of latches, one for each of the blades normally held in engagement with the rear end of the blade when the blade is in its radially projected position, and means for releasing each of said latches as the corresponding blade comes to a vertical position at the lowest point of its path of movement.

3. A plow including a rotatable member, a series of shovel blades mounted upon the periphery of said member and freely rotatable in a vertical plane, a stop disposed inward of the pivotal axis of each of the blades and with which the blades engage to limit the rotation of the blades in one direction, a spring for each blade acting to rotate said blade to a position against said stop, a plurality of latches, one for each of the blades engaging with the rear end of the blade when the blade is in its radially projected position and holding the blade against the stop, and means for releasing each of said latches as the corresponding blade comes to a vertical position at the lowest point of its path of movement to thereby permit the said blade to swing to a position substantially parallel with its path of travel.

4. A plow including a rotatable member, a series of shovel blades mounted upon the periphery of said member and freely rotatable in a vertical plane, a stop disposed inward of the pivotal axis of each of the blades and with which the blades engage to limit the rotation of the blades in one direction, a spring for each blade acting to rotate said blade to a position against said stop, a plurality of latches, one for each of the blades engaging with the rear end of the blade when the blade is in its radially projected position and holding the blade against the stop, and a fixed tripping member disposed approximately in line with a vertical plane cutting the axis of rotation of said rotatable member and in the path of movement of said latches whereby to trip each latch when its corresponding blade is in a downwardly projected vertical position to permit the blade to be turned upon its pivot by engagement with the ground.

5. A plow including a vertically disposed rotatable member, a plurality of shovel blades pivotally mounted upon the face of the member, a plurality of stops disposed inward of the pivotal axis of each blade and with which the blades engage when the blades are in a radial position, a plurality of spring actuated angular latches pivoted upon the face of said member, one for each blade, one arm of each latch having a detent tooth adapted to engage over the rear end of the corresponding blade when the blade is in a radially directed position, and a tripping member disposed vertically beneath the axis of rotation of the rotatable member and adapted to engage the other arm of each latch when the blade has arrived at a vertical downwardly projected position to shift the latch into position to release the blade and permit the blade to turn upon its pivot.

6. A plow including a vertically disposed rotatable member, a plurality of shovel blades pivotally mounted upon the face of the member, each blade having a portion projecting rearward of the pivotal axis of the blade, a plurality of stops disposed, one inward of the pivotal axis of each blade and with which said extended portion of the blade engages when the blade is in a radial position, means yieldingly holding the blades against said stops, a plurality of spring actuated angular latches pivoted upon the face of said member, one for each blade, one arm of each latch having a detent tooth adapted to engage over the extension of the corresponding blade when the blade is in a radially directed position, and a tripping member disposed vertically beneath the axis of rotation of the member and adapted to engage the other arm of each latch when the blade has arrived at a vertical, downwardly projected position to thereby release the blade and permit it to return upon its pivot.

7. A plow including a supporting frame, a transversely extending shaft, a pair of disks mounted upon the said shaft, and rotatable around a central axis, a plurality of blade supporting shafts extending through the peripheries of the said disks, a plurality of blades mounted upon each of said blade supporting shafts and rotatable therewith, means carried upon the faces of the disks adapted to lock each of the shafts with its blades in a radially projecting position, and means for releasing said locking means when the blades are in an approximately vertical downwardly projected position at the lowest point of their path to permit the blades thereafter to have free pivotal movement with their shafts until they are again locked.

8. In a rotary plow, oppositely disposed rotatable members, a plurality of transversely arranged shovel blades mounted between said members and carried thereby, the shovel blades adjacent said members extending laterally and thereby overlapping the plane of the members.

9. A rotary plow including oppositely disposed rotatable disks, transverse rotatable shafts mounted on and extending between the disks, and a plurality of shovel blades mounted upon said shafts, the shovel blades adjacent said disks having portions projecting through the plane of the disks whereby to cut the ground beneath said disks.

In testimony whereof I affix my signature in presence of two witnesses.

OLIVER W. JOHNSON. [L. S.]

Witnesses:
THOMAS A. KNIGHT,
THOS. N. JACKSON.

Copies of this patent may be obtained for five cents each, by addressing the "Commissioner of Patents, Washington, D. C."